Sept. 11, 1962  E. LOEPFE  3,053,139
ELECTRO-OPTICAL WEFT FEELER FOR LOOMS
Filed May 25, 1959  2 Sheets-Sheet 1
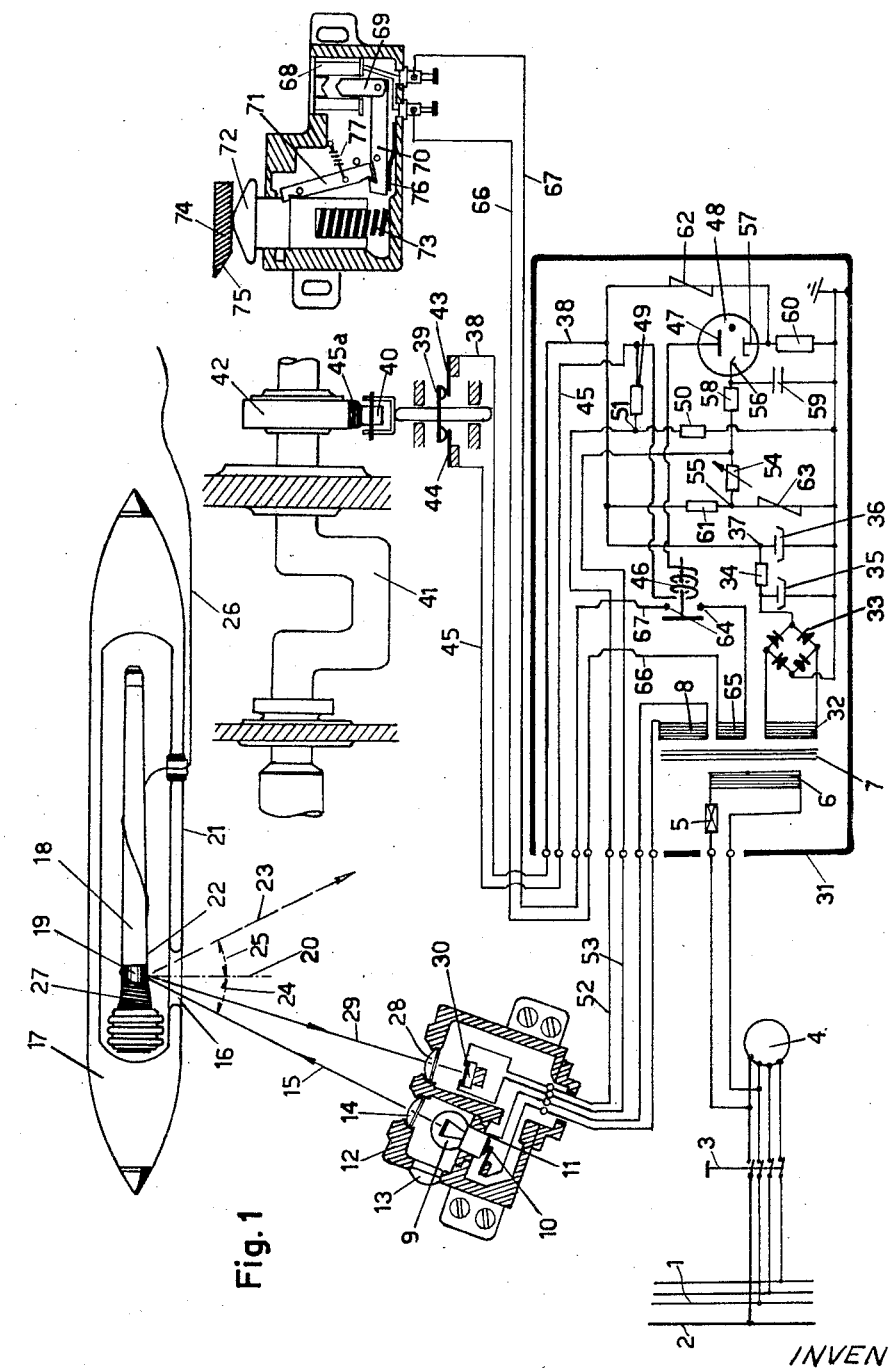
INVENTOR
ERICH LOEPFE
Richards and Geier
ATTORNEYS Sept. 11, 1962 E. LOEPFE 3,053,139
ELECTRO-OPTICAL WEFT FEELER FOR LOOMS
Filed May 25, 1959 2 Sheets-Sheet 2
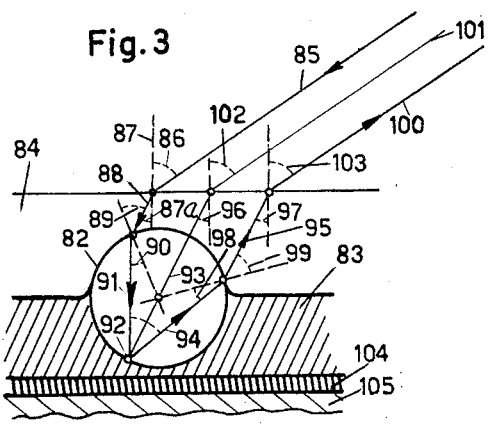
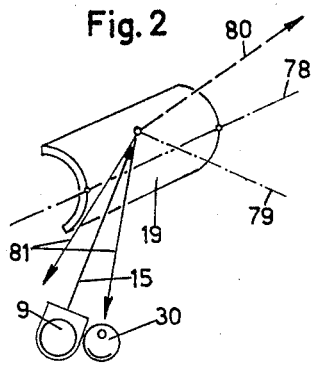
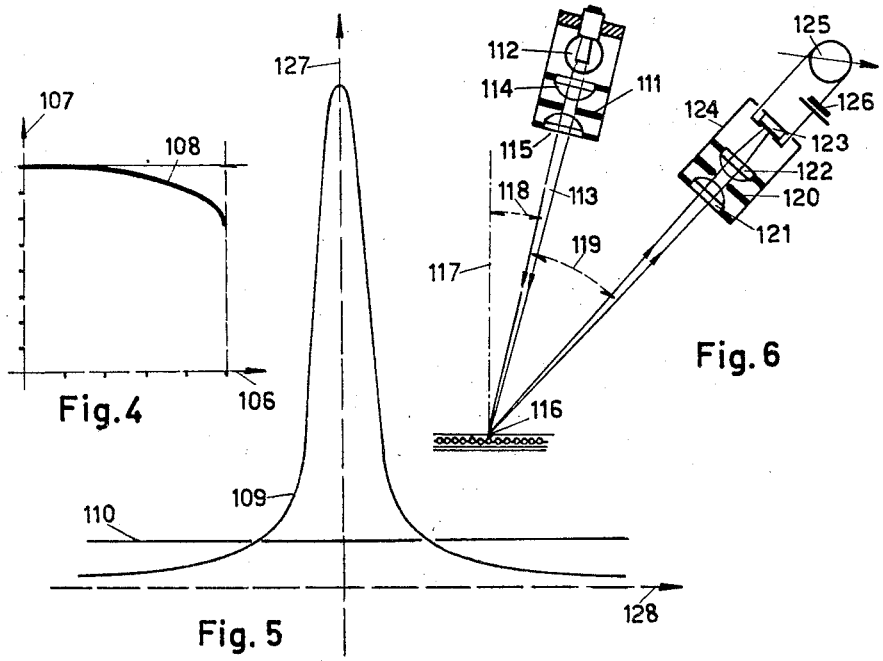
INVENTOR
ERICH LOEPFE
Richards and Geier
ATTORNEYS

United States Patent Office 3,053,139
Patented Sept. 11, 1962

3,053,139
ELECTRO-OPTICAL WEFT FEELER FOR LOOMS
Erich Loepfe, Im Rossweidli 64, Zurich, Switzerland
Filed May 25, 1959, Ser. No. 815,621
1 Claim. (Cl. 88—14)

This invention relates to an electro-optical method of and apparatus for sensing in counting, regulating, and control systems or the like. This application is a continuation-in-part of my co-pending patent application, Ser. No. 591,005, filed May 18, 1956.

The method of the present invention is based on the known principle of modulating the intensity of a beam of light in such manner that a beam emanating from a source is reflected by the sensed object into a photo-electric cell. The beam is thus used as a vehicle for conveying the information, while the information itself is embodied in the intensity of the beam.

It is known that the characterization of positive or negative conditions, or of a certain object, or of a particular part thereof, can be effected by the differentiation of the object from its environment by means of brighter or darker coloration. Consequently, characterization is based upon differences in the coefficient of diffuse reflection. When the sensing beam passes across the object the light and dark modulation of the reflected rays produces a corresponding response in a photo-electric cell and this may be used for the control of switching arrangements.

However, an arrangement of this kind has the disadvantage that the effective intensity of the light is very small, since the sensing beam is diffusively reflected within a solid angle of 180°, so that a very small proportion actually enters the photo-electric cell. Comparatively weak external sources of light, such as electric lamps, windows, etc. have a sufficient intensity to produce an interference background which must be continually compensated. Moreover, the equipment readily reacts to false optical signals, because the environment of the sensed object may be capable of diffuse reflection or absorption which is as effective as the object itself.

Another prior art method makes use of reflection by mirrors. Although this method greatly increases effective intensity by comparison with diffuse reflection, it has the disadvantage of requiring source, photo cell, and reflecting element to be disposed in accurate relative geometrical positions. Consequently, the equipment must be of precision manufacture. If the special shape of the object calls for the use of a curved reflecting surface, the sensing beam must be a narrow pencil to avoid appreciable divergence of the reflected rays. Frequently, in such cases plane mirrors cannot be used at all.

An attempt has been made to improve prior art methods by replacing the single differentiated reflecting element by a plurality of such elements. This produces a pattern of alternately reflecting and absorbing elements. Sensing can then be performed by two methods, either by simultaneously sensing all the elements, a separate combination of source and photo cell being available for each element of the pattern, and the output circuits of the photo cells being coupled by means of a coincidence system which transmits a pulse only when there is a simultaneous response from all the cells, or, alternatively, by the elements being scanned in succession by a single cell, the individual pulses being integrated and the sequence frequency at the same time filtered by electrical or mechanical means. Both methods are based on the same idea, namely, that the product of several probabilities must be smaller and at most equal to any individual factor of the product.

Both methods, i.e. the coincidence and the integration method, have the disadvantage that they introduce considerable complications by comparison with the single element system and that the much greater superficial area of the pattern renders its characterization less precise. Moreover, when using the integration method, advantage cannot be taken of the stability and reliability of Kipp relay or flip-flop electronics which must be replaced by the less stable method of using a characteristic with adjustable threshold value. Moreover, response depends upon the scanning speed.

An object of the present invention is the provision of an apparatus and a method of scanning permitting the retention of Kipp relay circuits which are unaffected by scanning speeds and have sufficient discriminating power to ensure a high margin of safety in regard to all possible tolerances even when single element systems are used.

Other objects of the present invention will be apparent in the course of the following specification.

The present invention is based essentially on the idea of utilizing a substance for characterization which produces ray reversing reflection.

It is the property of such a substance that it reflects all rays of any incidence approximately in the angle of incidence (unlike normal reflection in which the reflected ray is symmetrical to the incident ray in relation to the normal at the point of incidence). Ray reversing reflection is, therefore, auto-collimating. Every ray is reflected in the direction of incidence irrespective as to the particular angular position of the reflecting element. In other words curved surfaces act as if they were "plane mirrors."

Known substances of this kind are katadioptric reflectors consisting of a transparent base with similarly transparent mainly spherical occlusions of considerably different refractive index. They may be applied to the surface that is to be characterized in the form of films, coatings, or the like, or alternately they may be contained in the material of which the body is made.

The invention will appear more clearly from the following detailed description when taken in connection with the accompanying drawing showing, by way of example, preferred embodiments of the inventive idea.

In the drawing:

FIGURE 1 is a diagrammatic view, partly in section, showing a bobbin feeler provided with a katadioptric reflector according to the present invention.

FIGURE 2 is a diagrammatic perspective view illustrating means for preventing false reflections.

FIGURE 3 is a diagram illustrating the direction of rays in a katadioptric reflector consisting of half-reflecting glass balls.

FIGURE 4 is a diagram illustrating the refraction index ratio of the reflector shown in FIGURE 3 as a function of the distance adjusted to the ball radius of the incident ray from the central ray.

FIGURE 5 is a diagram illustrating the intensity of ray reversing reflection and usual diffused reflection as a function of the angle of incidence.

FIGURE 6 illustrates diagrammatically a device for measuring the ray angle distribution shown in FIGURE 5.

An illustrative example is shown in FIGURE 1 which represents a weft bobbin feeler for looms. The problem in this case is to stop the loom or to trip an automatic bobbin changing device before the bobbin has run empty. For this purpose the stem of the bobbin 18 is provided with a ring 19 of a ray reversing substance, the arrangement being such that the ring is uncovered as the thread 26 gradually unwinds but before the last remainder of thread 27 has been used.

The diagram of FIGURE 1 shows a three phase net provided with a zero conductor 2 and supplying electrical current over the switch 3 to the motor 4 which drives the loom. Current is withdrawn between the switch 3 and motor 4 from one of the phases 1 and the zero conductor 2 and is supplied over a safety fuse 5 to the primary winding 6 of a transformer 7. The transformer 7 has a secondary winding 8 which is connected over contacts 10 and 11 with an electric lamp 9. A ground glass disc 13 which is built into the casing 12, and which is illuminated by the lamp 9, serves as a control light.

A lens 14 is used to transmit a bundle of rays, the central ray of which is indicated diagrammatically by the numeral 15 in FIG. 1, through a slot 16 in the side wall of the shuttle 17 to the shuttle spool 18.

The rear end of the spool 18 carries a narrow ring 19, consisting of a katadioptric light reflecting substance. So long as the spool 18 is covered by the yarn to such an extent that the katadioptric reflector 19 is covered by the yarn or thread, the light rays 15 will not reach the katadioptric reflector and will be reflected diffusely throughout the entire space. Those parts of the shuttle which reflect normally, such as its walls 21, or the surface 22 of the yarn, will reflect the light rays 15 along the direction 23, according to the usual reflection laws, whereby the angle 24 between the rays 15 and the perpendicular line 20 is equal to the angle 25 between the perpendicular line 20 and the direction 23 of the reflected rays.

However, as soon as the yarn 26 is used up to such an extent that only a small reserve 27 is carried by the shuttle, the katadioptric ring 19 will be freed from yarn and will receive the light rays 15. These light rays will be now reflected by the katadioptric reflector 19 approximately in the direction of their incidence. A lens 28 is located as closely as possible to the lens 14 which transmits the light rays 15. The lens 28 will receive the light rays 29 reflected by the katadioptric reflector 19 and will project them upon a photo-electric cell 30.

The electronic part of the device is located in a separate casing 31. The transformer 7 has another secondary winding 32, which is connected with a current rectifier 33, a resistance 34 and electrolytic condensers 35 and 36. Thus, at a point 37 a direct voltage of approximately 250 volts is produced. This direct current is transmitted through a conduit 38 to a switch 39. The switch 39 is actuated by a roller 40, which in its turn is actuated by a cam disk 42 mounted upon the crankshaft 41 of the loom. In the course of every rotation of the crankshaft 41, the contacts 43 and 44 of the switch 39 are interconnected for a time period, the duration of which depends upon the length of the portion 45a of the cam 42.

The contact 44 is connected by a conduit 45 over a relay winding 46 with the anode 47 of the cold-cathode thyratron 48. At the same time, at the point 51, a portion of the potential prevailing at 37 is transmitted by means of voltage dividers 49 and 50 through the conduit 52 to the cadmium sulfide photo-resistance of the photo cell 30. The other side of the photo-resistance is subjected to the potential prevailing at the point 55, by means of conduit 53 and a variable resistance 54. The potential at the point 55 is so set that when the photo cell 30 is not illuminated, the firing potential of the cold cathode thyratron 48 between the starter 56 and the cathode 57 is not reached as yet.

However, when the switch 39 is closed and when the bundle of light rays 29 reflected by the katadioptric reflector 19 strikes the photo cell 30, then its inner resistance is lowered. Consequently, a current begins to flow between the points 51 and 55 which is so high (a few hundred μa.) that the voltage drop at the variable resistance 54 suffices to bring the starter potential at the point 56 above the firing value. Consequently, a main discharge will be started between the anode 47 and the cathode 57. In this discharging condition the resistance 58 limits the current flowing through the starter 56 to a value which will not damage the tube. The condenser 59 serves the purpose of providing good firing in that it is charged when the starter potential is increased, so that it carries a sufficient reserve of electrical charge at the time of firing. The two resistances 60 and 61 and the two varistors 62 and 63 are joined in a bridge connection and are subjected to the potential at the point 37, whereby the points 55 and 57 form the diagonal of this bridge connection. This connection serves to correct changes in the brightness of the lamp 9 caused by variations in the network 1, 2. When the net voltage is increased and thus the brightness of the lamp increases also, there is a drop in the potential difference between the points 55 and 57 and vice versa. Thus, variations in the sensitivity of the circuit containing the photo-resistance, are balanced by the opposed voltage variation at the starter of the thyratron.

When the thyratron 48 is fired, the relay 46 is actuated. The contact 64 of the relay 46 then connects the third secondary winding 65 of the transformer 7 through the conduits 66 and 67 with the solenoid 68. Then the solenoid 68 attracts the core 69 and thus releases the pawl 71 by means of the lever 70. Then the pawl 71 frees the bolt 72 so that the spring 73 can move upwardly the bolt 72 and actuate the lever 74 which stops the loom.

The cam disk 42 is so set that when the loom stops the switch 39 will be open. This also opens the anode circuit of the thyratron so that the thyratron is again extinguished.

Should the operator actuate again the lever 74, the bolt 72 will be pressed downwardly by means of the inclined surface 75. Then the spring 73 is again placed under tension and the levers 70 and 71 are moved into their initial positions by means of the springs 76 and 77 which are connected therewith.

Incorrect reflections of strongly reflecting yarn 26, or some reflecting parts which extend parallel to the longitudinal direction of the shuttle, such as the spool outer surface 22, the shuttle wall 21, or the like, can be eliminated in a simple manner which is diagrammatically indicated in FIG. 2. This is achieved in that the projected light ray 15 is not directed precisely toward the meridian line 78 of the katadioptric reflector ring 19, but is directed somewhat higher or somewhat lower in relation thereto, and, secondly, in that it is not directed perpendicularly to the longitudinal axis, consequently, not parallel to the perpendicular line 79, but somewhat inclined thereto. This arrangement makes it certain that the ray 80 which is reflected according to the laws of regular mirror reflection by the reflecting textile material with which the spool is wound (and by analogy, the rays 23 reflected by the shuttle wall, etc.) will not reach the photo-electric cell 30. On the other hand, a substantial part of the rays 81 reflected in the direction of incidence by the katadioptric reflector 19 will reach the photoelectric cell 30 independently of the position and the curvature of the katadioptric reflector 19.

FIGURE 3 illustrates the simplest example of a katadioptric reflector. It consists of fine glass spheres 82 having a diameter of from a few hundredths to a few tenths of a millimeter. The glass balls 82 are embedded to one-half in a pigment layer 83 which is provided with aluminum scales. The front surface of the glass balls 82 is covered with a transparent layer 84 of a plastic material.

When a light ray 85 strikes the synthetic layer 84 at an angle 86 to the perpendicular line 87, the direction of the light is refracted. Since the layer 84 has a refraction index which is higher than the surrounding air, the angle 87a is smaller than the angle 86. The light ray 88 will reach under the angle 89 the glass ball 82. Here its direction is again changed and by a suitable selection of refraction indices, it is possible to attain that the angle 90 will be smaller than the angle 89, and that the ray 91 will strike the surface of the ball 82 at the rear passing point 92 of the axial ray 93. Here the light is reflected and in accordance with the laws of reflection, the incident ray 91 and reflected ray 94 extend symmetrically to the projection line 93. Since the central ray 93 constitutes an axis of symmetry in the synthetic medium 84, the ray 95 leaves the ball 82 parallel to the ray 88. Particularly, the three angles 87a, 96 and 97 are equal to each other. This is also true as far as the angles 90 and 98, as well as the angles 89 and 99 are concerned. Thus, outside of the layer 84 the emerging ray 100 extends parallel to the incident light ray 85 and the two light rays 85 and 100 are both parallel to the central ray 101. The three angles 96, 102, and 103 are equal to each other.

When the following indicia are used:

Radius of the glass ball 82 _____ R
Refraction index of the layer 84 _____ $n_1$
Refraction index of the glass ball 82 _____ $n_2$
Distance of the light ray 88 from the central ray 93 __ r
Angle 89 _____ α
Angle 90 _____ β

Then the basic requirement that each light ray 88 penetrating the glass ball parallel to the ray 93 is refracted to the point 92, can be expressed by the following formula:

$$\sin \beta = \sin \frac{\alpha}{2} \quad (1)$$

The law of refraction states that $$\frac{\sin \alpha}{\sin \beta} = \frac{n_2}{n_1} \quad (2)$$

furthermore:

$$\sin \alpha = \frac{r}{R} \quad (3)$$

Using the half-angle relation:

$$\sin \frac{\alpha}{2} = \sqrt{\frac{1-\cos \alpha}{2}} \quad (4)$$

It follows from the Equations 1, 2, 3 that:

$$\frac{n_1}{n_2} \cdot \frac{r}{R} = \sqrt{\frac{1-\sqrt{\frac{r^2}{R^2}}}{2}} \quad (5)$$

By squaring twice and by a suitable rearrangement the following functional relationship is produced:

$$\frac{n_1^2}{n_2^2}\left[1-\left(\frac{n_1 r}{n_2 R}\right)^2\right] = \frac{1}{4} \cdot \frac{r}{R} = 0 \ldots 1 \quad (6)$$

In Fig. 4 the abscissa 106 carries $$\frac{r}{R}$$

(1 scale division=0.2), and the ordinate 107

$$\frac{n_2}{n_1}$$

(1 scale division=0.25); the curve 108 illustrates the Formula 6. If the edge zone of the glass ball represented by $$\frac{r}{R} \geq 0.8$$

be left out of consideration, then for the remaining part of the curve for attaining the initially set requirement the following average refraction ratio is required:

$$\frac{n_2}{n_1} \sim 1.92$$

Thus it is apparent that each ray of light penetrating the glass ball parallel to the ray 88 (FIG. 3), is refracted sufficiently closely to the point 92 so that it also leaves the ball parallel to the ray 88. Consequently, this parallel arrangement is also provided for all rays extending parallel to the ray 85 which are located outside of the layer 84, independently of their distance from the central ray 101. It is apparent that all these considerations are entirely independent of the angle of incidence 86.

If a large number of such individual balls 82 is placed one next to the other, a katadioptric surface is produced which reflects a parallel ray of light of finite area independently of its angle of incidence substantially in the same direction. In actual practice this entire system is arranged as a bendable, gluable foil. A plastic foil 104 serves, for example, as a carrier of balls and is provided upon its reverse side with glue 105. A katadioptric reflector of the above-described type is disclosed, for instance, in the United States Patent No. 2,592,882.

FIGURE 5 shows a curve 109 illustrating the light intensity taking place at the reverse reflection. The diffused reflection is illustrated by the curve 110.

The diagram shown in FIG. 5 can be easily obtained by the measuring device shown in FIG. 6, and comprising a screen 111, as well as a source of light 112. A very narrow ray of light 113 emitted by the source 112 and produced by the screen 111 is passed through two lenses 114 and 115 and strikes at the point 116 a katadioptric reflector of the type illustrated in FIG. 3 and hereinabove described. The ray of light is thereupon projected upon a diffused reflector, consisting of very fine $Al_2O_3$ powder. The angle of incidence relatively to the perpendicular line 117 is indicated by the numeral 118. A light receiver 124 is placed at the variable angle 119 relatively to the projected ray 113. The receiver 124 consists of a narrow screen 120, two lenses 121 and 122 and a photo-resistance 123. A microampere meter 125 is used to measure the electrical photo current supplied by the battery 126 and flowing through the photo-resistance 123. The entire device is so dimensioned that the two openings of the screens 111 and 120 are always small compared to the variable angle 119. Values for very small angles 119, which cannot be measured for practical reasons, can be extrapolated.

In FIG. 5 the electrical photo current measured by the microampere meter 125 is indicated upon the ordinate 127, while the angle 119 is indicated upon the abscissa 128; the angle 118 remains constant. It is apparent from an examination of FIG. 5 that the reversing reflection 109 has a very precise directional characteristic, and in the case of the best katadioptric reflectors now available, has a half-angular width which amounts to less than 8°. The increase by comparison to the best diffuse reflector, consisting of $Al_2O_3$, amounts to 40:1, this being the ratio of the curve 109 to the curve 110 in relation to the Y-axis. Consequently, the discriminating differential, which may be defined as the intensity ratio between a substantially 100% diffused reflection and a katadioprtic reflector for infinitely small vergence, is something like 1:40. In actual practice, if the above stated requirements are followed, a finite vergence will produce a ratio which is always in excess of 1:8, so that Kipp-relay, i.e. flip-flop circuits, will provide a considerable margin of safety even after allowing for all tolerances.

It is apparent that the example shown above has been given solely by way of illustration and not by way of limitation and that it is subject to many variations and modifications within the scope of the present invention. All such variations and modifications are to be included within the scope of the present invention.

What is claimed is:

An apparatus for automatically actuating a loom when the supply of yarn upon the weft bobbin of the loom is nearly exhausted, said apparatus comprising, in combination, a katadioptric ray reversing reflector carried by the weft bobbin, a lamp adapted to illuminate said katadioptric reflector when said katadioptric reflector is exposed by the yarn, a photo-electric cell located close to said lamp and receiving light reflected by said katadioptric reflector substantially in the direction of its incidence, a poly-phase electrical source, a transformer having a primary winding connected with said source and three secondary windings, one of said secondary windings being connected with said lamp, a rectifier connected with the other one of said secondary windings, a relay having two contacts and a winding, a thyratron having an anode connected with one end of said winding, means connecting a portion of the rectifier potential to said photo-electric cell, said rectifier potential being such that said thyratron is not fired when said photo-electric cell is not illuminated, a cam-driven switch having two contacts, means connecting said rectifier to a contact of said switch, means connecting the other contact of said switch to the other end of said winding, an actuating mechanism, a solenoid operating said actuating mechanism, means connecting one end of said solenoid with one end of the third one of said secondary windings, means connecting the other end of said solenoid with one of the contacts of said relay, and means connecting the other one of the contacts of said relay with the other end of the third one of said secondary windings.

References Cited in the file of this patent

UNITED STATES PATENTS

| | | |
|---|---|---|
| 2,026,149 | Turner | Dec. 31, 1935 |
| 2,738,197 | Stevens | Mar. 13, 1956 |
| 2,878,589 | Mongello | Mar. 24, 1959 |

FOREIGN PATENTS

| | | |
|---|---|---|
| 600,330 | Germany | July 21, 1934 |

Disclaimer 3,053,139.—*Erich Loepfe*, Zurich, Switzerland. ELECTRO-OPTICAL WEFT FEELER FOR LOOMS. Patent dated Sept. 11, 1962. Disclaimer filed Feb. 26, 1970, by the inventor.
 Hereby enters this disclaimer to claim 1 of said patent.
  [*Official Gazette April 14, 1970.*]